US012600166B2

(12) United States Patent　(10) Patent No.:　US 12,600,166 B2

Honda et al.　(45) Date of Patent:　Apr. 14, 2026

---

(54) WHEEL CAP

(71) Applicant: KABUSHIKI KAISHA TOKAI-RIKA-DENKI-SEISAKUSHO, Aichi-ken (JP)

(72) Inventors: Masahiro Honda, Aichi (JP); Keisuke Matoba, Aichi (JP); Satoshi Ito, Aichi (JP); Keiichi Kitayama, Aichi (JP); Reiya Ichimura, Aichi (JP); Tomoyuki Ishikawa, Aichi (JP); Hideya Kusunoki, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 606 days.

(21) Appl. No.: 17/985,433

(22) Filed: Nov. 11, 2022

(65) Prior Publication Data

US 2023/0158830 A1　May 25, 2023

(30) Foreign Application Priority Data

Nov. 19, 2021　(JP) ................................. 2021-188865

(51) Int. Cl.
B60B 7/08　　(2006.01)
B60B 7/06　　(2006.01)
B60B 7/10　　(2006.01)

(52) U.S. Cl.
CPC ................ B60B 7/08 (2013.01); B60B 7/065 (2013.01); B60B 7/10 (2013.01)

(58) Field of Classification Search
CPC .. B60B 7/08; B60B 7/065; B60B 7/10; B60B 7/02; B60B 7/066
See application file for complete search history.

(56) References Cited

U.S. PATENT DOCUMENTS 3,361,483 A * 1/1968 Main ......................... B60B 7/00
301/37.42
3,894,775 A * 7/1975 Christoph ............... B60B 7/068
301/37.35
(Continued)

FOREIGN PATENT DOCUMENTS

CN　　1640693 A　　7/2005
EP　　0310777 A1 *　4/1989
(Continued)

OTHER PUBLICATIONS

An Office Action mailed by China National Intellectual Property Administration on Jun. 27, 2025, which corresponds to Chinese Patent Application No. 202211424362.4 and is related to U.S. Appl. No. 17/985,433.

*Primary Examiner* — Kip T Kotter

(74) *Attorney, Agent, or Firm* — Studebaker Brackett PLLC

(57)　　ABSTRACT

A wheel cap includes a cap body having a wheel side face and another face serving as a styling face on an opposite side from the wheel side face; a first engagement leg provided standing out from the wheel side face and configured to be inserted into a through hole of the wheel, with the first engagement leg abutting a first attachment portion of a peripheral edge of the through hole at a first angle with respect to an insertion direction; and a second engagement leg provided standing out from the wheel side face as a pair with the first engagement leg and configured to be inserted into the through hole of the wheel, with the second engagement leg abutting a second attachment portion at the peripheral edge of the through hole at a second angle with respect to the insertion direction, the second angle being greater than the first angle.

14 Claims, 5 Drawing Sheets

(56)          References Cited

U.S. PATENT DOCUMENTS

| | | | | | |
|---|---|---|---|---|---|
| 4,004,837 | A | * | 1/1977 | Main | B60B 7/08 |
| | | | | | 301/37.42 |
| 4,040,672 | A | * | 8/1977 | Imahashi | B60B 7/08 |
| | | | | | 301/108.3 |
| 5,803,552 | A | * | 9/1998 | Kato | B60B 7/066 |
| | | | | | 301/37.41 |
| 6,247,760 | B1 | | 6/2001 | Kinoshita | |
| 6,439,670 | B1 | * | 8/2002 | Winters | B60B 7/08 |
| | | | | | 301/37.101 |
| 7,314,255 | B2 | * | 1/2008 | Wang | B60B 7/10 |
| | | | | | 301/37.102 |
| 2005/0134107 | A1 | | 6/2005 | Nakamura | |
| 2007/0096545 | A1 | * | 5/2007 | Wang | B60B 7/065 |
| | | | | | 301/37.42 |
| 2007/0126280 | A1 | * | 6/2007 | Gerard | B60B 7/0013 |
| | | | | | 301/37.101 |
| 2014/0239702 | A1 | * | 8/2014 | von Roenne | B60B 7/08 |
| | | | | | 301/37.102 |
| 2018/0099524 | A1 | * | 4/2018 | Wang | B60B 7/065 |

FOREIGN PATENT DOCUMENTS

| | | | | |
|---|---|---|---|---|
| JP | H05-002321 | Y | | 1/1993 |
| JP | 2016068899 | A | * | 5/2016 |
| KR | 10-2001-0107203 | A | | 12/2001 |

* cited by examiner

WHEEL CAP

CROSS-REFERENCE TO RELATED APPLICATION

This application is based on and claims priority under 35 USC 119 from Japanese Patent Application, No. 2021-188865 filed Nov. 19, 2021, the disclosure of which is incorporated by reference herein in its entirely.

BACKGROUND

Technical Field

The present disclosure relates to a wheel cap for mounting to a wheel of a vehicle.

Related Art

In a wheel cap of Japanese Utility Model Application Laid-Open (JPU) No. H05-2321, an attachment claw includes two claw bodies formed bent into a shape of open legs, and the attachment claw is employed for hooking and retaining. The wheel cap is accordingly attached to a wheel disc by the claw bodies of the attachment claw straddling between hole edges of two heat dissipation holes of the wheel disc.

The two claw bodies of the attachment claw each undergo similar elastic deformation and are hooked onto the hole edges of the two heat dissipation holes.

SUMMARY

In consideration of the above circumstances, the present disclosure provides a wheel cap with suppressed rattling about with respect to a wheel.

A wheel cap of a first aspect of the present disclosure includes a cap body, a first engagement leg, and a second engagement leg. The cap body has a wheel side face that is configured to be disposed on a side of a wheel, and has another face serving as a styling face on an opposite side in an axial direction from the wheel side face of the cap body. The first engagement leg is provided standing out from the wheel side face and is configured to be inserted into a through hole of the wheel, with the first engagement leg abutting a first attachment portion of a peripheral edge of the through hole at a first angle with respect to an insertion direction such that the first engagement leg is able to suppress uncoupling of the cap body from the wheel. The second engagement leg is provided standing out from the wheel side face as a pair with the first engagement leg and is configured to be inserted into the through hole of the wheel, with the second engagement leg abutting a second attachment portion at the peripheral edge of the through hole at a second angle with respect to the insertion direction, the second angle being greater than the first angle such that the second engagement leg is configured to urge the first engagement leg toward the first attachment portion and to suppress uncoupling of the cap body from the wheel.

A wheel cap of a second aspect of the present disclosure includes a cap body, a first engagement leg, and a second engagement leg. The cap body has a wheel side face that is configured to be disposed on a side of a wheel, and has another face serving as a styling face on an opposite side in an axial direction from the wheel side face of the cap body. The first engagement leg is provided standing out from the wheel side face and is configured to be inserted into a first through hole of the wheel, with the first engagement leg abutting a first attachment portion of a peripheral edge of the first through hole at a first angle with respect to an insertion direction such that the first engagement leg is able to suppress uncoupling of the cap body from the wheel. The second engagement leg is provided standing out from the wheel side face as a pair with the first engagement leg and is configured to be inserted into a second through hole of the wheel, with the second engagement leg abutting a second attachment portion at a peripheral edge of the second through hole at a second angle with respect to the insertion direction, the second angle being greater than the first angle such that the second engagement leg is configured to urge the first engagement leg toward the first attachment portion and to suppress uncoupling of the cap body from the wheel.

A wheel cap of a third aspect is the first aspect or the second aspect, wherein the first angle is 0°.

A wheel cap of a fourth aspect is the first aspect or the second aspect, further includes an urging member configured to urge the first engagement leg toward the first attachment portion and to urge the second engagement leg toward the second attachment portion.

A wheel cap of a fifth aspect is the first aspect or the second aspect, wherein a protruding portion that protrudes toward a first attachment portion side of the peripheral edge of the through hole is provided at a portion of the first engagement leg that is protruded out from the through hole of the wheel.

In the wheel cap of the first aspect or the second aspect, the face on the opposite side of the cap body from the wheel side face serves as the styling face, and the first engagement leg and the second engagement leg are provided as a pair standing out from the wheel side face of the cap body. The first engagement leg is able to suppress uncoupling of the cap body from the wheel by being inserted into the through hole of the wheel and abutting the first attachment portion of the peripheral edge of the through hole. Moreover, the second engagement leg urges the first engagement leg toward the first attachment portion and suppresses uncoupling of the cap body from the wheel by being inserted into the through hole of the wheel and abutting the second attachment portion of the peripheral edge of the through hole. Uncoupling of the cap body from the wheel is accordingly suppressed by the first engagement leg and the second engagement leg.

The first engagement leg abuts the first attachment portion of the peripheral edge of the through hole at the first angle with respect to the insertion direction of the first engagement leg, and the second engagement leg abuts the second attachment portion of the peripheral edge of the through hole at the second angle with respect to an insertion direction of the second engagement leg, and the first angle is smaller than the second angle.

This enables the first engagement leg to bear some of the urging force of the second engagement leg, enables rattling about of the first engagement leg and the second engagement leg with respect to the through hole be suppressed, and enables rattling about of the cap body with respect to the wheel to be suppressed.

In the wheel cap of the third aspect, the first angle is 0°. Thus the first engagement leg effectively bears some of the urging force of the second engagement leg, and rattling about of the cap body with respect to the wheel can be suppressed from occurring.

In the wheel cap of the fourth aspect, the urging member urges the first engagement leg toward the first attachment portion and urges the second engagement leg toward the second attachment portion. This enables rattling about of the cap body with respect to the wheel to be effectively suppressed from occurring.

In the wheel cap of the fifth aspect, the protruding portion is provided at the first engagement leg that is protruded out from the through hole of the wheel. The protruding portion is accordingly able to effectively suppress movement of the first engagement leg and the second engagement leg in a direction of pull-out from the through hole, enabling uncoupling of the cap body from the wheel to be effectively suppressed from occurring.

BRIEF DESCRIPTION OF THE DRAWINGS

Exemplary embodiments of the present disclosure will be described in detail based on the following figures, wherein.

DETAILED DESCRIPTION

Detailed explanation follows regarding exemplary embodiments of the present disclosure, with reference to the drawings.

First Exemplary Embodiment

Figure 1:
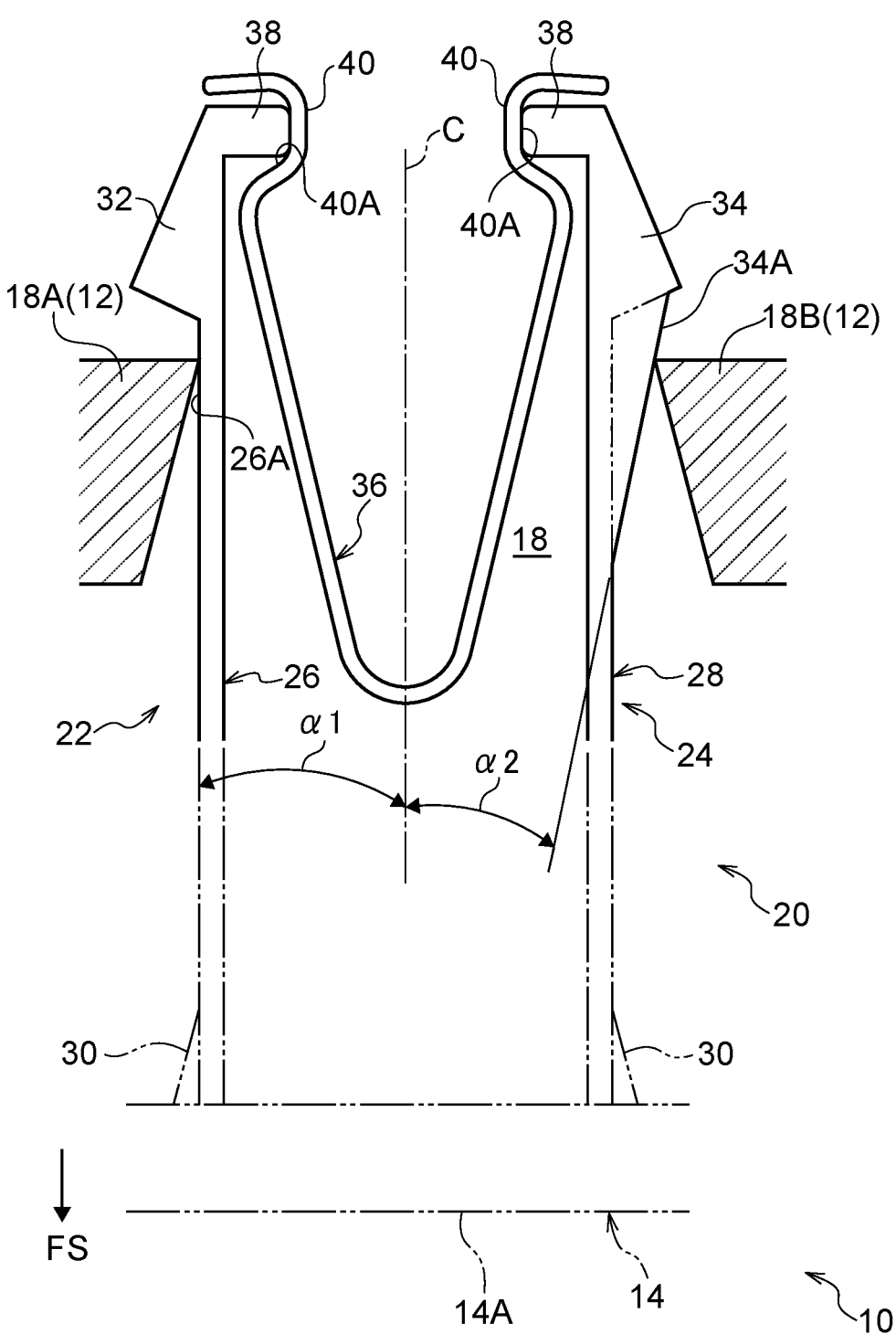
FIG. 1 is a cross-section of relevant portions of a wheel cap according to a first exemplary embodiment, taken along a direction intersecting with a wheel radial direction.
Figure 2:
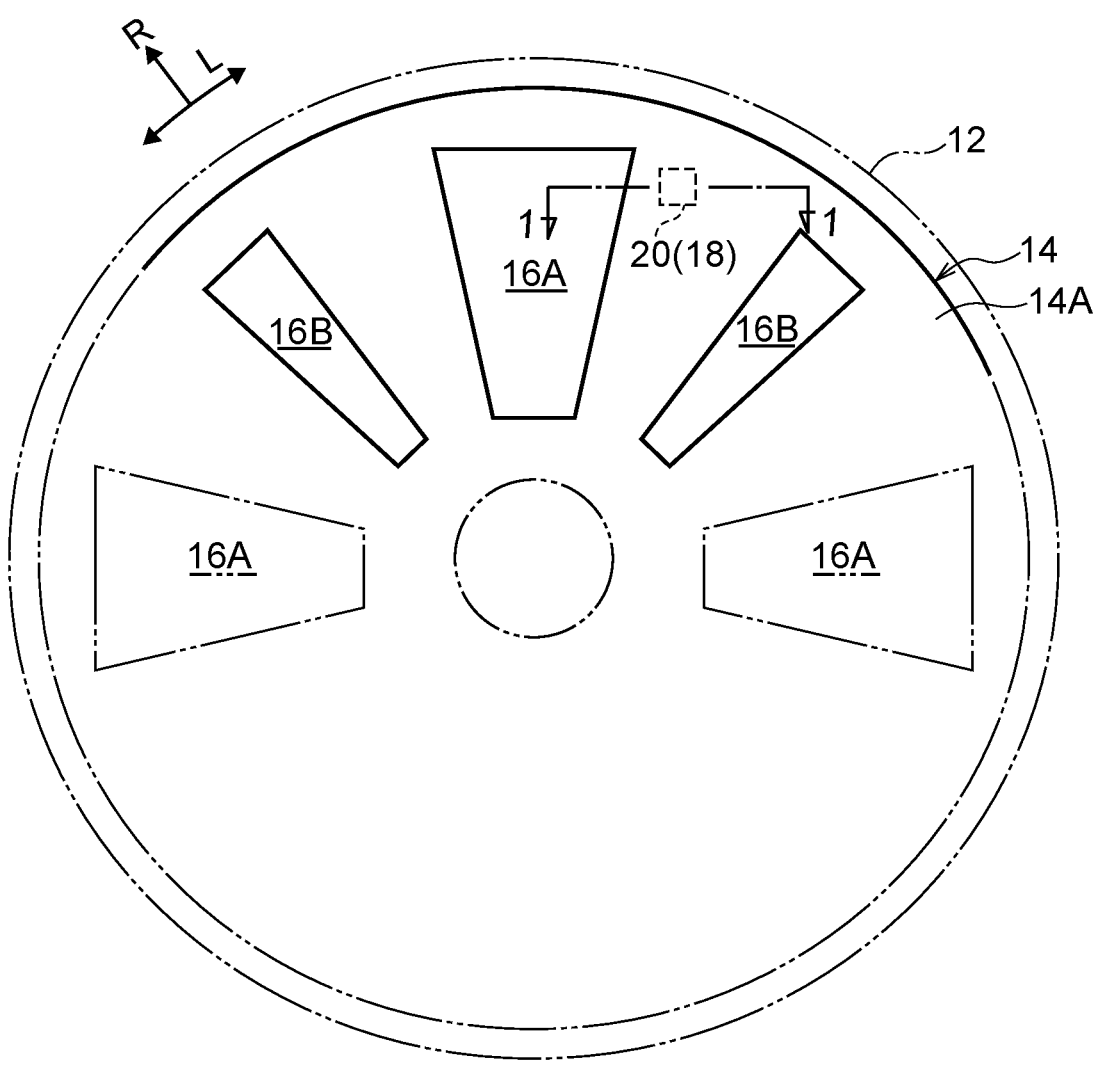
FIG. 2 is a face-on view schematically illustrating a wheel cap according to the first exemplary embodiment.

FIG. 2 illustrates a schematic configuration of a wheel cap 10 according to a first exemplary embodiment, as viewed face-on from a front side thereof. FIG. 1 illustrates relevant portions of the wheel cap 10 in a cross-section taken along line 1-1 of FIG. 2. Note that in the drawings the outer surface side of the wheel cap 10 is indicated by arrow FS, a circumferential direction of the wheel cap 10 is indicated by arrow L, and a radial direction outer side of the wheel cap 10 is indicated by arrow R.

As illustrated in FIG. 2, the wheel cap 10 is mounted (attached) to an outer surface side of a wheel 12. The wheel cap 10 includes a cap body 14 made from a resin and having a substantially circular disc shaped external profile, with the cap body 14 having a styling face 14A on one side in an axial direction thereof. Plural decorative holes 16A, 16B that each have a substantially trapezoidal shape are formed so as to pierce through the cap body 14, with the decorative holes 16A, 16B disposed alternately to each other along the circumferential direction of the cap body 14 and formed at the cap body 14 in a radiating shape overall.

The wheel 12 is made of metal (made of aluminum or steel, for example), and the wheel 12 is attached to a hub provided at a vehicle width direction outer side of a vehicle (neither of which are illustrated in the drawings). The cap body 14 of the wheel cap 10 is attached to the width direction (axial direction) outer side of the wheel 12, is visible from vehicle exterior, and the wheel cap 10 covers and decorates the wheel 12.

As illustrated in FIG. 1 and FIG. 2, attachment holes 18 serving as through holes are formed so as to penetrate through outer peripheral portions of the wheel 12 that are covered by the cap body 14 (portions between the decorative holes 16A and the decorative holes 16B), with the plural attachment holes 18 being formed at specific intervals along the circumferential direction of the wheel 12 (not illustrated in the drawings). In the first exemplary embodiment, an opening center line C of each of the attachment holes 18 is substantially parallel to an axis line (center axis) of the wheel 12. Note that the attachment holes 18 may have a circular shape and may have a rectangular shape.

An engaging portion 20 is provided at the cap body 14 at each position corresponding to the respective attachment holes 18 of the wheel 12. In the first exemplary embodiment, in each of the engaging portions 20 an engagement claw 22 serving as a first engagement leg and an engagement claw 24 serving as a second engagement leg are provided as a pair so as to stand out from a back face of the cap body 14 (the face on the opposite side from the styling face 14A, a wheel side face). The cap body 14 is mounted to the wheel 12 by the engagement claws 22, 24 of each of the plural engaging portions 20 being inserted so as to be disposed as far as a specific position (mounted position) into the attachment holes 18 of the wheel 12 and engage with the wheel 12.

Portions of the wheel 12 at peripheral edges of the attachment holes 18 opposing the engagement claws 22 configure first attachment portions 18A, and portions thereat opposing the engagement claws 24 configure second attachment portions 18B.

The engagement claws 22, 24 are integrally formed to the cap body 14 so as to obtain a given rigidity and elasticity. The engagement claws 22, 24 include respective leg pillars 26, 28 provided so as to extend in directions parallel to the opening center line C of the attachment holes 18 (axial direction of the attachment holes 18), with ribs 30 formed between base portions of the respective leg pillars 26, 28 and the back face of the cap body 14. In each of the engagement claws 22 a claw portion 32 serving as a protruding portion and as a first protruding portion is formed at a leading end portion of the leg pillar 26, and in each of the engagement claws 24 a claw portion 34 serving as a second protruding portion is formed at a leading end portion of the leg pillar 28.

The claw portion 32 of each of the engagement claws 22 protrudes out toward an opposite side from the engagement claw 24, and by the engagement claw 22 being inserted into the attachment hole 18 as far as the specific position, the claw portion 32 is disposed further to the vehicle width direction inside than the attachment hole 18 and an opposing face 26A of the leg pillar 26 opposes the first attachment portion 18A of each of the attachment holes 18.

The claw portion 34 of each of the engagement claws 24 protrudes out toward an opposite side from the engagement claw 22. The leg pillar 28 is thicker walled than the leg pillar 26 at a face on a second attachment portion 18B side of the leg pillar 28 (a shape 6 corresponding to the claw portion 32 is illustrated thereon by the double-dot broken line). Thus an inclined face 34A of the engagement claw 24 is provided so as to extend toward the base portion of the leg pillar 28 inclined in a direction away from the second attachment portion 18B on progression from a protrusion leading end of the claw portion 34 toward the leg pillar 28 side. The inclined face 34A abuts a corner portion at a vehicle width direction inner side of the second attachment portion 18B of the attachment hole 18 (on the opposite side of the wheel 12 from the cap body 14) by the engagement claw 24 being inserted into the attachment hole 18 as far as the specific position. A length between the wheel side face, at which the engagement claw 22 stands out, and the first attachment portion 18A of the first attachment hole 18, to which the first engagement claw 22 abuts, is substantially the same as a length between the wheel side face, at which the second engagement claw 24 stands out, and the second attachment portion 18B of the attachment hole 18, to which the second engagement claw 24 abuts.

The opposing face 26A of the engagement claw 22 forms an angle α1 serving as a first angle with an insertion direction of the engagement claw 22. Moreover, the inclined face 34A of the engagement claw 24 forms an angle α2 serving as a second angle with the insertion direction of the engagement claw 24. In the engaging portion 20, the angle α2 is set as an acute angle (0<α2)<90°, and the angle α1 is set smaller than the angle α2. The angle α1 is set to 0° (α1=) 0° in the engaging portion 20.

Moreover, in the engaging portion 20, a separation interval between a face of the leg pillar 26 on the opposite side from that of the engagement claw 24 (a face on the first attachment portion 18A side thereof) and a face of the leg pillar 28 on the opposite side from that of the engagement claw 22 (a face on the second attachment portion 18B side thereof) is set smaller than an opening width of the attachment hole 18. Moreover, in each of the engaging portions 20, a separation interval between the opposing face 26A of the engagement claw 22 and a protrusion leading end of the claw portion 34 of the engagement claw 24 is set larger than the opening width of the attachment hole 18. Thus the engagement claws 22, 24 are able to move in an insertion direction and a pull-out direction into/out of the attachment hole 18 by leading end portions of the claw portions 32, 34 being moved so as to approach each other.

An engagement spring 36 serving as an urging member is provided to the engaging portion 20, with the engagement spring 36 being formed from a strip shape of metal bent into a substantially U-shape, and with a bending center of the engagement spring 36 disposed on the cap body 14 side and interposed between the engagement claws 22, 24.

The engagement spring 36 is anchored onto projections 38 respectively formed at the claw portion 32 of the engagement claw 22 and at the claw portion 34 of the engagement claw 24, with the projections 38 protruding in directions approaching each other at respective upper ends of the claw portion 32 and of the claw portion 34.

An anchor portion 40 is formed at each leading end portion of the engagement spring 36. Bent portions 40A are formed by bending intermediate portions of the anchor portions 40 in directions toward each other, and leading ends of the anchor portions 40 are provided in directions heading away from each other.

The engagement spring 36 is respectively anchored to the engagement claws 22, 24 by the projection 38 of the engagement claw 22 and the projection 38 of the engagement claw 24 each being housed in the respective bent portions 40A of the anchor portion 40, such that the engagement claws 22, 24 are urged in directions away from each other. Note that recesses or through holes may be formed at the bent portions 40A of the engagement spring 36 for the leading ends of the projections 38 to fit together with, such that vibration of the wheel 12 does not cause the projections 38 to come out of the bent portions 40A and does not cause the engagement spring 36 to come off from the engagement claws 22, 24.

Next, description follows regarding operation of the first exemplary embodiment.

The plural attachment holes 18 are disposed along a circumferential direction of the wheel 12 to which the wheel cap 10 is attached, with the attachment holes 18 being formed piercing through the wheel 12. The engaging portions 20 are formed at the cap body 14 of the wheel cap 10 so as to be aligned with each of the attachment holes 18. The engaging portions 20 each include the engagement claw 22 formed with the claw portion 32 on the leg pillar 26 and the engagement claw 24 formed with the claw portion 34 on the leg pillar 28 arranged as a pair. The engagement spring 36 is provided to the engaging portion 20, with the engagement spring 36 disposed so as to straddle between the engagement claws 22, 24.

The styling face 14A is on the outer surface side of the cap body 14, and the cap body 14 is attached to the wheel 12 so as to decorate the outer surface of the wheel 12 by the engagement claws 22, 24 disposed at the opposite side face of the cap body 14 from the styling face 14A approaching each other against urging force of the engagement spring 36 so as to be inserted into and disposed in the attachment holes 18.

Inserting the engagement claw 22 into the attachment hole 18 results in the claw portion 32 protruding out from the attachment hole 18 toward the vehicle width direction inner side and the opposing face 26A of the leg pillar 26 being opposed to the first attachment portion 18A at a peripheral edge of the attachment hole 18. Inserting the engagement claw 24 into the attachment hole 18 results in the leading end portion of the claw portion 34 protruding out from the attachment hole 18 toward the vehicle width direction inner side, and the inclined face 34A of the claw portion 34 being abutted against a corner of the second attachment portion 18B at a peripheral edge of the attachment hole 18.

In the engaging portion 20, abutting the inclined face 34A against the second attachment portion 18B results in the opposing face 26A abutting and pressing against the first attachment portion 18A and the inclined face 34A abutting and pressing against the second attachment portion 18B. The engagement spring 36 also urges the engagement claws 22, 24 toward the first attachment portion 18A and the second attachment portion 18B, respectively.

Thus, although in the engaging portion 20, the load generated by the engagement claw 22 and the load generated by the engagement claw 24 are different from each other, a specific load can be imparted to peripheral edges of the attachment hole 18 and engagement can be achieved. Moreover, the cap body 14 can be engaged with the wheel 12 by the engagement claws 22, 24 engaging with the peripheral edges of the attachment holes 18 of the wheel 12.

Moreover, the engaging portions 20 need a large force to achieve an engagement-released state pulled out from the attachment holes 18, and the engaging portions 20 are suppressed from uncoupling from the attachment holes 18. The wheel cap 10 is attached to the wheel 12 by the cap body 14 engaging with the wheel 12 at plural locations around the circumferential direction of the wheel 12.

Figure 3:
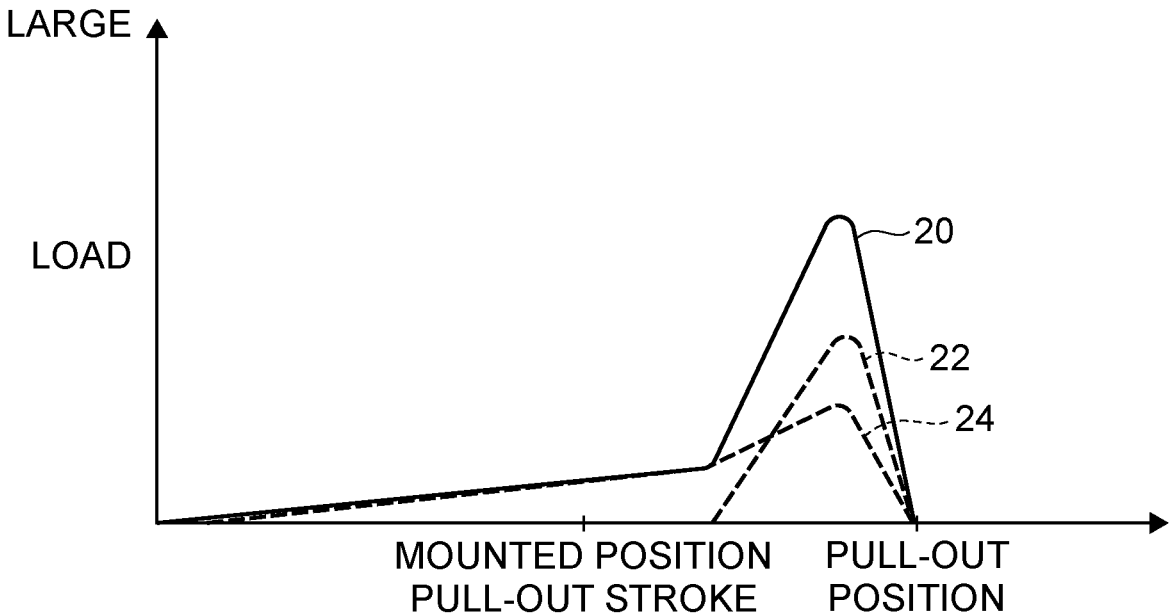
FIG. 3 is a graph schematically illustrating load change with respect to a pull-out stroke of an engagement claw in the first exemplary embodiment.

FIG. 3 is a graph schematically illustrating load change with respect to a pull-out stroke of the engagement claws 22, 24 from the attachment holes 18. Note that in FIG. 3, the horizontal axis indicates the pull-out stroke of the engagement claws 22, 24 from the attachment holes 18, and the vertical axis indicates a load generated on the engagement claws 22, 24 and on the engaging portions 20 (and similarly on the wheel 12). The pull-out position in FIG. 3 is a position where the engagement claws 22, 24 have been pulled out from the attachment holes 18 (a position where engagement with the attachment holes 18 has been released), and a mounted position is a position where the engagement claws 22, 24 have engaged with the attachment holes 18.

As illustrated in FIG. 3, a specific load is imparted to the engagement claw 24 and the engaging portion 20 by the inclined face 34A of the engagement claw 24 abutting the second attachment portion 18B at the mounted position of the cap body 14 mounted to the wheel 12. The engaging portions 20 are thereby retained inside the attachment holes 18, and the cap body 14 is retained on the wheel 12.

Then in order to pull the engagement claw 22 and the engagement claw 24 out from the attachment hole 18 from this state, a pull-out load at the engagement claw 22 increases until the claw portion 32 reaches the first attachment portion 18A, and then this load gradually decreases when the protrusion leading end of the claw portion 32 passes the first attachment portion 18A. Moreover, the load at the engagement claw 22 disappears as the claw portion 32 passes the pull-out position when pulled out from the attachment hole 18.

Moreover, in order to pull the engagement claw 22 and the engagement claw 24 out from the attachment hole 18, the second attachment portion 18B moves relatively to the engagement claw 24 along the inclined face 34A of the claw portion 34 toward the protrusion leading end of the claw portion 34, and so there is a gradual increase in the pull-out load. This load reaches a maximum when the second attachment portion 18B is positioned at the protrusion leading end of the claw portion 34, and then this load decreases when the second attachment portion 18B passes the protrusion leading end of the claw portion 34. This load at the engagement claw 24 disappears as the claw portion 34 has passed the pull-out position when pulled out from the attachment hole 18.

Furthermore, in the engaging portion 20 the engagement claws 22, 24 are imparted with an urging force by the engagement spring 36, and the load of the engagement claws 22, 24 during the pull-out stroke is increased by the urging force of the engagement spring 36. There is accordingly a large increase in the load during the pull-out stroke of the engaging portion 20 from the attachment hole 18, and the engaging portion 20 is prevented from uncoupling from the attachment hole 18. Moreover, the engagement spring 36 is interposed between the engagement claw 22 and the engagement claw 24. This means that the engagement claw 22 presses the engagement spring 36 toward the engagement claw 24 when the claw portion 32 of the engagement claw 22 catches on the first attachment portion 18A, and in turn the engagement spring 36 presses the engagement claw 24 (the second protruding portion) toward the second attachment portion 18B. This accordingly increases the load to pull the engaging portion 20 out from the attachment hole 18 (see FIG. 3), enabling the engaging portion 20 to be effectively prevented from uncoupling from the attachment hole 18.

However in the engaging portion 20, the engagement spring 36 is interposed between the engagement claws 22, 24 and the engagement spring 36 urges the engagement claws 22, 24 toward the first attachment portion 18A and the second attachment portion 18B, respectively. The cap body 14 is thereby effectively engaged with the attachment holes 18 of the wheel 12, and the wheel cap 10 is effectively attached to the wheel 12.

The anchor portions 40 of the engagement spring 36 are moreover respectively anchored to the projections 38 at the leading end portions of the engagement claws 22, 24, and the engagement spring 36 urges the leading end portions of the engagement claws 22, 24. Thus the leg pillars 26, 28 are urged by the engagement spring 36 in a spreading direction about fulcra of the first attachment portion 18A and the second attachment portion 18B. This means that in cases in which bending of the leg pillars 26, 28 was to occur in the engagement claws 22, 24, such bending of the leg pillars 26, 28 is eliminated and the engagement claws 22, 24 are suppressed from undergoing creep deformation.

In each of the engaging portions 20, the angle $\alpha1$ of the opposing face 26A of the engagement claw 22 abutting the first attachment portion 18A is smaller than the angle $\alpha2$ of the inclined face 34A of the engagement claw 24 abutting the second attachment portion 18B ($\alpha1<\alpha2<90°$). This enables the engagement claw 22 to bear some of the urging force on the engagement claw 24 in the engaging portion 20, and respective movement of the engagement claws 22, 24 relative to the attachment hole 18 is suppressed more than when the angle $\alpha1$ and the angle $\alpha2$ are the same as each other. This enables rattling about of the wheel cap 10 to be suppressed from occurring.

Moreover, the angle $\alpha1$ is set to $0°$ ($\alpha1=0°$) in the engaging portion 20. This means that inserting the engagement claws 22, 24 into the attachment hole 18 so as to be disposed therein results in the engagement claw 22 being retained with respect to the first attachment portion 18A by the urging force on the engagement claw 24, enabling the engaging portions 20 to retain the cap body 14 at a constant position with respect to the wheel 12.

Second Exemplary Embodiment

Next explanation follows regarding a second exemplary embodiment of the present disclosure.

Figure 4:
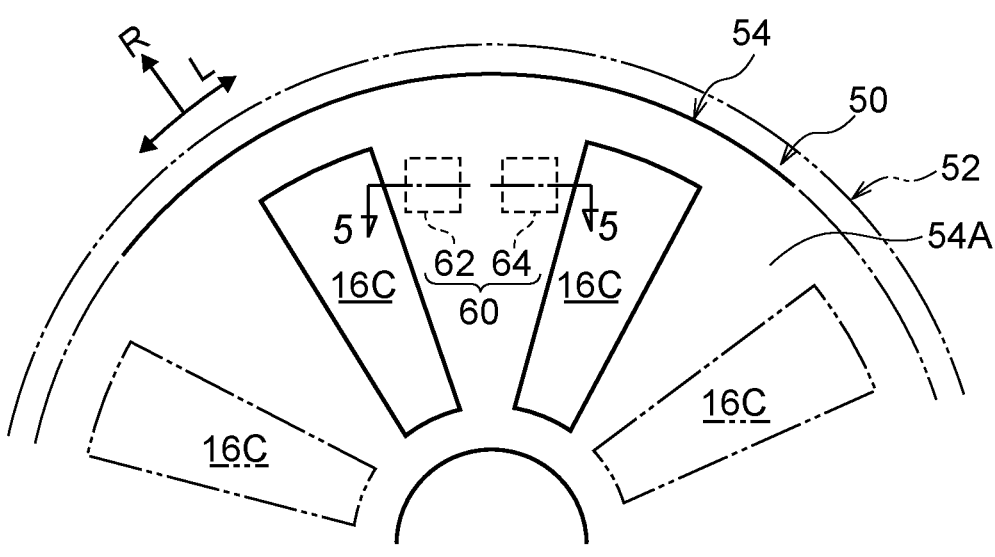
FIG. 4 is a face-on view schematically illustrating relevant portions of a wheel cap according to a second exemplary embodiment.
Figure 5:
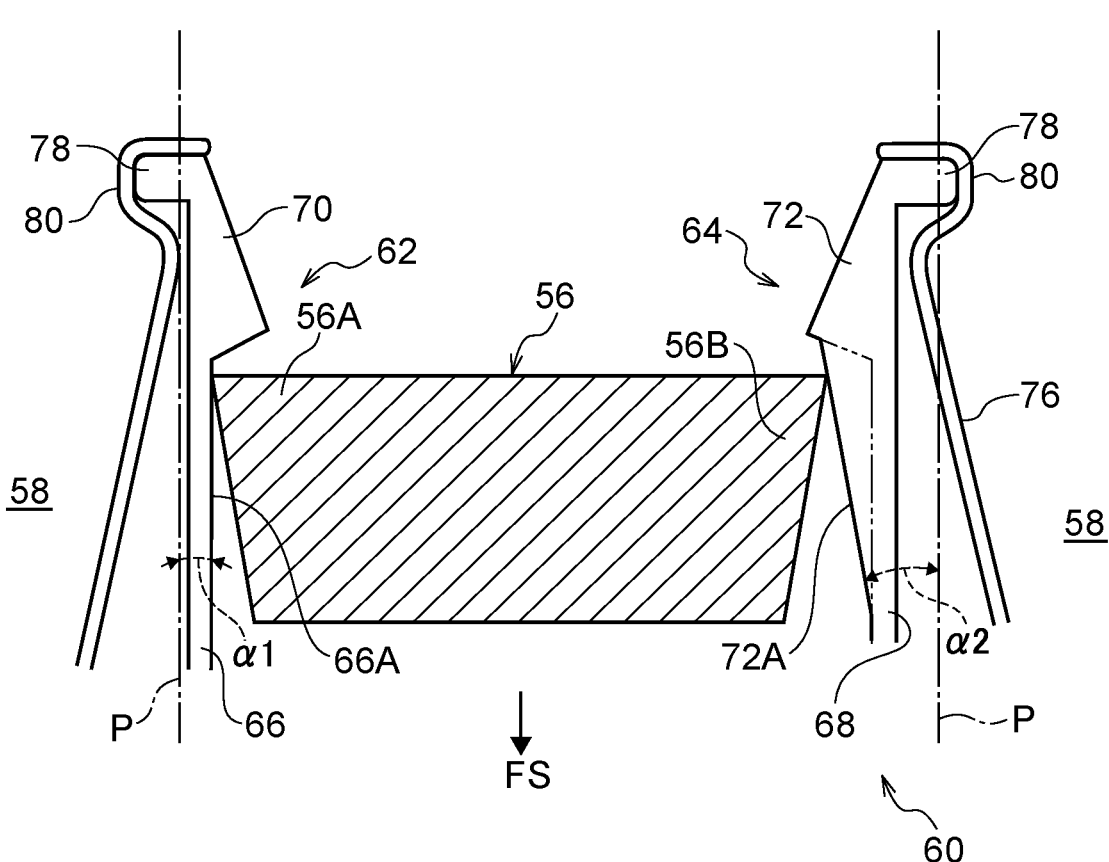
FIG. 5 is a cross-section of relevant portions of a wheel cap according to the second exemplary embodiment, taken along a direction intersecting with a wheel radial direction.

FIG. 4 is a face-on view illustrating relevant portions of a wheel cap 50 according to the second exemplary embodiment, and FIG. 5 is a cross-section of the wheel cap 50 taken along line 5-5 of FIG. 4.

As illustrated in FIG. 4, the wheel cap 50 is mounted to an outer surface side of a wheel 52. The wheel cap 50 includes a cap body 54 (only part thereof illustrated in FIG. 4) made from a resin and having a substantially circular disc shaped external profile, with the cap body 54 having a styling face 54A on one side in an axial direction thereof. Plural decorative holes 16C that each have a substantially trapezoidal shape, for example, are formed piercing through the cap body 54, with the decorative holes 16C disposed along the circumferential direction of the cap body 54 and formed at the cap body 54 in a radiating shape overall.

Plural spokes 56 (only part thereof illustrated in FIG. 5) are formed in a radial shape at the wheel 52 decorated by the cap body 54, and parts of the cap body 54 between circumferential direction-adjacent decorative holes 16C cover the spokes 56 of the wheel 52. In the second exemplary embodiment, heat dissipation holes 58 (see FIG. 5) are formed as through holes piercing the wheel 52 between the circumferential direction-adjacent spokes 56, with the heat dissipation holes 58 piercing through along an axial direction of the wheel 52.

Engaging portions 60 are provided at the cap body 54 at positions aligned with each of the spokes 56 of the wheel 52. The engaging portions 60 each include an engagement claw 62 serving as a first engagement leg and an engagement claw 64 serving as a second engagement leg provided as a pair so as to stand out from a back face of the cap body 54 (a face on the opposite side from that of the styling face 54A, a wheel side face). In the engaging portions 60, the engagement claws 62 are each aligned with a heat dissipation hole 58 at a circumferential direction one side of a given spoke 56, and the engagement claws 64 are each aligned with a heat dissipation hole 58 at a circumferential direction other side of a spoke 56, with the engagement claws 62, 64 inserted into each of the respective heat dissipation holes 58 along an axial direction of the wheel 52.

In each of the engaging portions 60, the engagement claw 62 has a similar external profile to that of the engagement claw 22 of the engaging portion 20 of the first exemplary embodiment, and the engagement claw 64 has a similar external profile to that of the engagement claw 24 of the engaging portion 20 therein. In each of the engaging portions 60, the engagement claw 62 is inserted into and disposed at a specific position in the heat dissipation hole 58 on the circumferential direction one side of a spoke 56, and the engagement claw 64 is inserted into and disposed at a specific position in the heat dissipation hole 58 on the circumferential direction other side of a spoke 56. The engagement claws 62, 64 are engaged with the spokes 56 by each being inserted as far as the specific position into the heat dissipation holes 58, and the cap body 54 is mounted to the wheel 52 thereby.

In the wheel 52, a portion opposing the engagement claw 62 at a peripheral edge of the heat dissipation hole 58 on the circumferential direction one side of a spoke 56 configures a first attachment portion 56A, and a portion opposing the engagement claw 64 at a peripheral edge of the heat dissipation hole 58 on the circumferential direction other side of the spoke 56 configures a second attachment portion 56B.

The engagement claws 62, 64 are integrally formed to the cap body 54 so as to obtain a given rigidity and elasticity. The engagement claws 62, 64 include respective leg pillars 66, 68 provided so as to extend in directions along lines P substantially parallel to the axial line of the wheel 52, with non-illustrated ribs (ribs 30, for example) formed between base portions of the respective leg pillars 66, 68 and the back face of the cap body 54.

In each of the engagement claws 62, a claw portion 70 serving as a protruding portion and as a first protruding portion is formed at a leading end portion of the leg pillar 66, and in each of the engagement claws 64, a claw portion 72 serving as a second protruding portion is formed at a leading end portion of the leg pillar 68. The claw portion 70 of each of the engagement claws 62 protrudes out toward an engagement claw 64 side (the first attachment portion 56A side), and inserting the engagement claw 62 into the heat dissipation hole 58 as far as the specific position results in the claw portion 70 protruding further to the vehicle width direction inner side than the heat dissipation hole 58 with an opposing face 66A of the leg pillar 66 opposing the first attachment portion 56A of the spoke 56.

The claw portion 72 of the engagement claw 64 moreover protrudes out toward an engagement claw 62 side (the second attachment portion 56B side) and an inclined face 72A is formed from a protrusion leading end thereof toward a leg pillar 68 side. The inclined face 72A abuts (contacts) a vehicle width direction inner side corner of the second attachment portion 56B of the spoke 56 by the engagement claw 64 being inserted into the heat dissipation hole 58 as far as the specific position. A length between the wheel side face, at which the first engagement claw 62 stands out, and the first attachment portion 56A of the spoke 56 at a first heat dissipation hole 58 side, to which the first engagement claw 62 abuts, is substantially the same as a length between the wheel side face, at which the second engagement claw 64 stands out, and the second attachment portion 56B of the spoke 56 at a second heat dissipation hole 58 side, to which the second engagement claw 64 abuts.

The opposing face 66A of the engagement claw 62 makes an angle α1 serving as a first angle with the line P along the insertion direction. The inclined face 72A of the engagement claw 64 makes an angle α2 serving as a second angle with the line P along the insertion direction. The angle α2 is an acute angle ($0<α2<90°$), and the angle α1 is smaller than the angle α2, with the angle α1 set to 0° ($α1=0°$) in the engaging portion 60.

A separation interval between a face on the first attachment portion 56A side of the engagement claw 62 and a face on the second attachment portion 56B side of the engagement claw 64 is set larger than a width of the spoke 56. A separation interval between the opposing face 66A on the first attachment portion 56A side of the engagement claw 62 and a protrusion leading end of the claw portion 72 of the engagement claw 64 is set narrower than a width of the spoke 56. Thus in the engaging portion 60, the leading end portions of the claw portions 70, 72 are moved in directions away from each other, enabling the engagement claws 62, 64 to be inserted into/pulled out of the heat dissipation hole 58, and enabling engagement with the spoke 56 and release of such engagement.

Engagement springs 74, 76 serving as urging members are provided at the engaging portion 60, with the engagement springs 74, 76 being made in a strip shape from metal. Base end sides of the engagement springs 74, 76 are anchored to the back face of the cap body 54 and leading end sides thereof respectively extend toward the claw portion 70 of the engagement claw 62 and toward the claw portion 72 of the engagement claw 64.

Projections 78 to which the engagement springs 74, 76 anchor are formed at the claw portion 70 and the claw portion 72, with the projections 78 respectively projecting from upper end portions of the engagement claw 62 and the engagement claw 64 in directions away from each other.

A bent portion 80 bent into a substantially U-shape is formed at a leading end portion of each of the engagement springs 74, 76. In the engagement spring 74, the bent portion 80 opens toward the claw portion 70 of the engagement claws 62 and in the engagement spring 76, the bent portion 80 opens toward the claw portion 72 of the engagement claw 64. The projection 78 of the engagement claw 62 is housed in the bent portion 80 and the engagement spring 74 is anchored to the engagement claw 62. The projection 78 of the engagement claw 64 is housed in the bent portion 80 and the engagement spring 76 is anchored to the engagement claw 64. In the engaging portion 60, the engagement springs 74, 76 are coupled together by a non-illustrated ring spring, and an urging force is applied to leading end sides of the engagement springs 74, 76 in a direction to approach each other.

In the second exemplary embodiment configured in this manner, the styling face 54A of the cap body 54 is disposed at the outer surface side, and the engagement claws 62, 64 engage with the spokes 56 of the wheel 52 due to the engagement claws 62, 64 moving away from each other against the urging force of the engagement springs 74, 76 and being inserted into and disposed in the heat dissipation holes 58 of the wheel 52. The cap body 54 of the wheel cap 50 is accordingly attached to the wheel 52 and decorates the outer surface side of the wheel 52.

The engagement claws 62 are each disposed at the vehicle width direction inner side (back side) of the spoke 56 by the engagement claw 62 being inserted into a heat dissipation hole 58 on one side in the wheel 52 circumferential direction, with the opposing face 66A of the leg pillar 66 abutting the first attachment portion 56A of the spoke 56. In the engagement claw 64, the leading end portion of the claw portion 72 is also disposed at the vehicle width direction inner side (back side) of the spoke 56 by the engagement claw 64 being inserted into a heat dissipation hole 58 at the other side in the wheel 52 circumferential direction, with the inclined face 72A of the claw portion 72 abutting the corner of the second attachment portion 56B of the spoke 56.

In the engaging portion 60, the opposing face 66A of the engagement claw 62 is abutted against the first attachment portion 56A by the inclined face 72A of the claw portion 72 of the engagement claw 64 being abutted against the second attachment portion 56B. The engagement claws 62, 64 thereby engage with the spoke 56 by nipping the spoke 56. When this occurs, the engagement claw 62 bears the urging force of the engagement claw 64 that is caused by the engagement claw 64 pressing the second attachment portion 56B, and the engagement claw 62 urges the first attachment portion 56A, and the engaging portion 60 is engaged with the wheel 52.

The engaging portion 60 can accordingly apply a specific load to and engage with the peripheral edges of the spoke 56 of the wheel 52. A large load also acts to release the engagement of the engaging portion 60 with the spoke 56. Thus in the engaging portions 60, the engagement claws 62, 64 engage with the spokes 56 of the wheel 52 so as to enable the cap body 54 to be engaged with the wheel 52. The engaging portions 60 also need a large force to achieve a released state of engagement to the spokes 56, enabling uncoupling of the cap body 54 from the wheel 52 to be suppressed. In the engaging portion 60, the engagement springs 74, 76 respectively urge the engagement claws 62, 64. The cap body 54 is accordingly effectively engaged with the spokes 56 of the wheel 52, and the wheel cap 50 is effectively attached to the wheel 52.

In the engaging portion 60, the engagement springs 74, 76 are attached to the engagement claws 62, 64, and the engagement springs 74, 76 urge the engagement claws 62, 64 in directions approaching each other. The engaging portions 60 are thereby effectively engaged with the spokes 56 (the wheel 52).

The engagement spring 74 is anchored to the leading end portion of the engagement claw 62, and the engagement spring 76 is anchored to the leading end portion of the engagement claw 64. The leg pillars 66, 68 of the engagement claws 62, 64 are urged by the engagement springs 74, 76 in a spreading direction about fulcra of the first attachment portion 56A and the second attachment portion 56B. In the engagement claws 62, 64, flexing is accordingly suppressed from occurring in the leg pillars 26, 28, suppressing creep deformation of the engagement claws 62, 64.

Moreover, in the engaging portion 60, the angle α1 of the opposing face 66A of the engagement claw 62 abutting the first attachment portion 56A is set smaller than the angle α2 of the inclined face 72A of the engagement claw 64 abutting the second attachment portion 56B (α1<α2<90°). Movement of each of the engagement claws 62, 64 is accordingly suppressed compared to cases in which the angle α1 and the angle α2 are the same as each other. Thus, the engaging portions 60 are able to suppress rattling about of the cap body 54 from occurring with respect to the spokes 56.

Moreover, due to the angle α1 being set to 0° (α1=0°) in the engaging portions 60, movement of the engagement claw 62 with respect to the first attachment portion 56A is suppressed, and the engaging portions 60 are able to suppress rattling about of the cap body 54 with respect to the wheel 52 and retain the cap body 54.

Note that although in the second exemplary embodiment, the engagement spring 74 and the engagement spring 76 are separate bodies, the engagement spring 74 and the engagement spring 76 may be integrally coupled together. This enables effective application of urging force to the engagement claws 62, 64.

Moreover in the first exemplary embodiment and the second exemplary embodiment, the inclined face 34A and the inclined face 72A in the engagement claw 24 and in the engagement claw 64 are respectively formed so as to reach the protrusion leading end of the claw portion 34 and the protrusion leading end of the claw portion 72. However, the protrusion leading end of the claw portion 34 and the protrusion leading end of the claw portion 72 may protrude further toward the second attachment portion 18B side and the second attachment portion 56B side than the inclined face 34A and the inclined face 72A, respectively. This enables uncoupling of the engaging portions 20 from the attachment holes 18 and release of engagement of the engaging portion 60 from the spokes 56 to be effectively prevented.

Note that in the first exemplary embodiment and the second exemplary embodiment, the engagement claws 22, 24 and the engagement claws 62, 64 are respectively arranged in a direction intersecting with a radial direction of the wheels 12, 52. However, a first engagement leg and a second engagement leg may be arranged along a radial direction of a wheel.

The first exemplary embodiment and the second exemplary embodiment respectively employ the engagement claws 22, 24 and the engagement claws 62, 64. However, any configuration may be adopted in which a first engagement leg is provided standing out from a face on a wheel side of a cap body, is inserted in a through hole in a wheel, and abuts a first attachment portion at a peripheral edge of the through hole at a first angle with respect to an insertion direction so as to be able to suppresses uncoupling of the cap body from the wheel, and a second engagement leg is provided standing out from the wheel side face of the cap body as a pair with the first engagement leg, is inserted in a through hole in the wheel, and abuts a second attachment portion of a peripheral edge of the through hole at a second angle greater than the first angle with respect to the insertion direction so as to urge the first engagement leg toward the first attachment portion and also suppress uncoupling of the cap body from the wheel.

What is claimed is:

1. A wheel cap, comprising:
a cap body having a wheel side face configured to be disposed on a side of a wheel and another face serving as a styling face on an opposite side from the wheel side face in an axial direction of the cap body;
a first engagement leg provided standing out from the wheel side face of the cap body and configured to be inserted into a through hole of the wheel, with the first engagement leg abutting a first attachment portion of a peripheral edge of the through hole at a first angle with respect to an insertion direction such that the first engagement leg is able to suppress uncoupling of the cap body from the wheel; and
a second engagement leg provided standing out from the wheel side face of the cap body as a pair with the first engagement leg and configured to be inserted into the through hole of the wheel, with the second engagement leg abutting a second attachment portion at the peripheral edge of the through hole at a second angle with respect to the insertion direction, the second angle being greater than the first angle such that the second engagement leg is configured to urge the first engagement leg toward the first attachment portion and to suppress uncoupling of the cap body from the wheel, wherein a portion, which faces the through hole, of the second engagement leg is thicker than a portion, which faces the through hole, of the first engagement leg.

2. The wheel cap of claim 1, wherein the first angle is 0°.

3. The wheel cap of claim 1, further comprising an urging member configured to urge the first engagement leg toward the first attachment portion and to urge the second engagement leg toward the second attachment portion.

4. The wheel cap of claim 1, wherein a protruding portion that protrudes toward a first attachment portion side is provided at a portion of the first engagement leg that is protruded out from the through hole of the wheel.

5. A wheel cap comprising:

a cap body having a wheel side face configured to be disposed on a side of a wheel and another face serving as a styling face on an opposite side from the wheel side face in an axial direction of the cap body;

a first engagement leg provided standing out from the wheel side face of the cap body and configured to be inserted into a first through hole of the wheel, with the first engagement leg abutting a first attachment portion of a peripheral edge of the first through hole at a first angle with respect to an insertion direction such that the first engagement leg is able to suppress uncoupling of the cap body from the wheel; and a second engagement leg provided standing out from the wheel side face of the cap body as a pair with the first engagement leg and configured to be inserted into a second through hole of the wheel, with the second engagement leg abutting a second attachment portion at a peripheral edge of the second through hole at a second angle with respect to the insertion direction, the second angle being greater than the first angle such that the second engagement leg is configured to urge the first engagement leg toward the first attachment portion and to suppress uncoupling of the cap body from the wheel, wherein a portion, which faces the second through hole, of the second engagement leg is thicker than a portion, which faces the first through hole, of the first engagement leg.

6. The wheel cap of claim 5, wherein the first angle is 0°.

7. The wheel cap of claim 5, further comprising an urging member configured to urge the first engagement leg toward the first attachment portion and to urge the second engagement leg toward the second attachment portion.

8. The wheel cap of claim 5, wherein a protruding portion that protrudes toward a first attachment portion side is provided at a portion of the first engagement leg that is protruded out from the first through hole of the wheel.

9. A wheel cap, comprising:

a cap body having a wheel side face configured to be disposed on a side of a wheel and another face serving as a styling face on an opposite side from the wheel side face in an axial direction of the cap body;

a first engagement leg provided standing out from the wheel side face of the cap body and configured to be inserted into a through hole of the wheel, with the first engagement leg abutting a first attachment portion of a peripheral edge of the through hole at a first angle with respect to an insertion direction such that the first engagement leg is able to suppress uncoupling of the cap body from the wheel; and a second engagement leg provided standing out from the wheel side face of the cap body as a pair with the first engagement leg and configured to be inserted into the through hole of the wheel, with the second engagement leg abutting a second attachment portion at the peripheral edge of the through hole at a second angle with respect to the insertion direction, the second angle being greater than the first angle such that the second engagement leg is configured to urge the first engagement leg toward the first attachment portion and to suppress uncoupling of the cap body from the wheel, wherein a length between the wheel side face, at which the first engagement leg stands out, and the first attachment portion of the peripheral edge of the through hole, to which the first engagement leg abuts, is the same as a length between the wheel side face, at which the second engagement leg stands out, and the second attachment portion of the peripheral edge of the through hole, to which the second engagement leg abuts.

10. A wheel cap comprising:

a cap body having a wheel side face configured to be disposed on a side of a wheel and another face serving as a styling face on an opposite side from the wheel side face in an axial direction of the cap body;

a first engagement leg provided standing out from the wheel side face of the cap body and configured to be inserted into a first through hole of the wheel, with the first engagement leg abutting a first attachment portion of a peripheral edge of the first through hole at a first angle with respect to an insertion direction such that the first engagement leg is able to suppress uncoupling of the cap body from the wheel; and a second engagement leg provided standing out from the wheel side face of the cap body as a pair with the first engagement leg and configured to be inserted into a second through hole of the wheel, with the second engagement leg abutting a second attachment portion at a peripheral edge of the second through hole at a second angle with respect to the insertion direction, the second angle being greater than the first angle such that the second engagement leg is configured to urge the first engagement leg toward the first attachment portion and to suppress uncoupling of the cap body from the wheel, wherein a length between the wheel side face, at which the first engagement leg stands out, and the first attachment portion of the peripheral edge of the first through hole, to which the first engagement leg abuts, is the same as a length between the wheel side face, at which the second engagement leg stands out, and the second attachment portion of the peripheral edge of the second through hole, to which the second engagement leg abuts.

11. The wheel cap of claim 1, wherein an inclined face is provided between the wheel side face and a portion that is protruded out from the through hole of the second engagement leg such that a thickness of the second engagement leg is increased from a wheel side face side toward the second attachment portion at the peripheral edge of the through hole.

12. The wheel cap of claim 5, wherein an inclined face is provided between the wheel side face and a portion that is protruded out from the second through hole of the second engagement leg such that a thickness of the second engagement leg is increased from a wheel side face side toward the second attachment portion at the peripheral edge of the second through hole.

13. The wheel cap of claim 9, wherein an inclined face is provided between the wheel side face and a portion that is protruded out from the through hole of the second engagement leg such that a thickness of the second engagement leg is increased from a wheel side face side toward the second attachment portion at the peripheral edge of the through hole.

14. The wheel cap of claim 10, wherein an inclined face is provided between the wheel side face and a portion that is protruded out from the second through hole of the second engagement leg such that a thickness of the second engagement leg is increased from a wheel side face side toward the second attachment portion at the peripheral edge of the second through hole.

* * * * *